United States Patent [19]
Thompson

[11] Patent Number: 5,951,811
[45] Date of Patent: Sep. 14, 1999

[54] METHOD FOR FORMING ADHESIVE SEAL FOR TIMER FLANGE

[75] Inventor: Gary M. Thompson, Turlock, Calif.

[73] Assignee: Volk Enterprises, Inc., Turlock, Calif.

[21] Appl. No.: 09/026,737

[22] Filed: Feb. 20, 1998

Related U.S. Application Data

[62] Division of application No. 08/704,484, Aug. 27, 1996.

[51] Int. Cl.$^6$ .............................. G01K 11/06; G01K 1/02
[52] U.S. Cl. ......................... 156/293; 116/218; 156/155; 156/344; 374/160
[58] Field of Search .................................... 156/155, 293, 156/294, 314, 344, 578; 374/160; 116/217, 218

[56] References Cited

U.S. PATENT DOCUMENTS 3,820,499  6/1974  Kliewer et al. ........................ 116/218
4,748,931  6/1988  Volk ........................................ 116/218

*Primary Examiner*—Jeff H. Aftergut
*Attorney, Agent, or Firm*—Flehr Hohbach Test Albritton & Herbert LLP; Julian Caplan

[57] ABSTRACT

A timer for poultry and other products comprises a barrel having a closed end and an open end surrounded by an external flange. Within the barrel is a stem which is spring-based upwardly but held in the barrel by an alloy or organic material which releases the stem at a pre-determined cooking temperature. In the past there has been a tendency for the stem to move upwardly ("creep") before the pre-determined cooking temperature is reached. The present invention applies an adhesive to the top of the external barrel flange and the bottom of a flange on the upper end of the stem to prevent creep and also to obstruct entry of juices into the barrel. Alternatively an accelerator for said adhesive is applied to said external barrel flange to shorten the time for curing said adhesive.

10 Claims, 3 Drawing Sheets

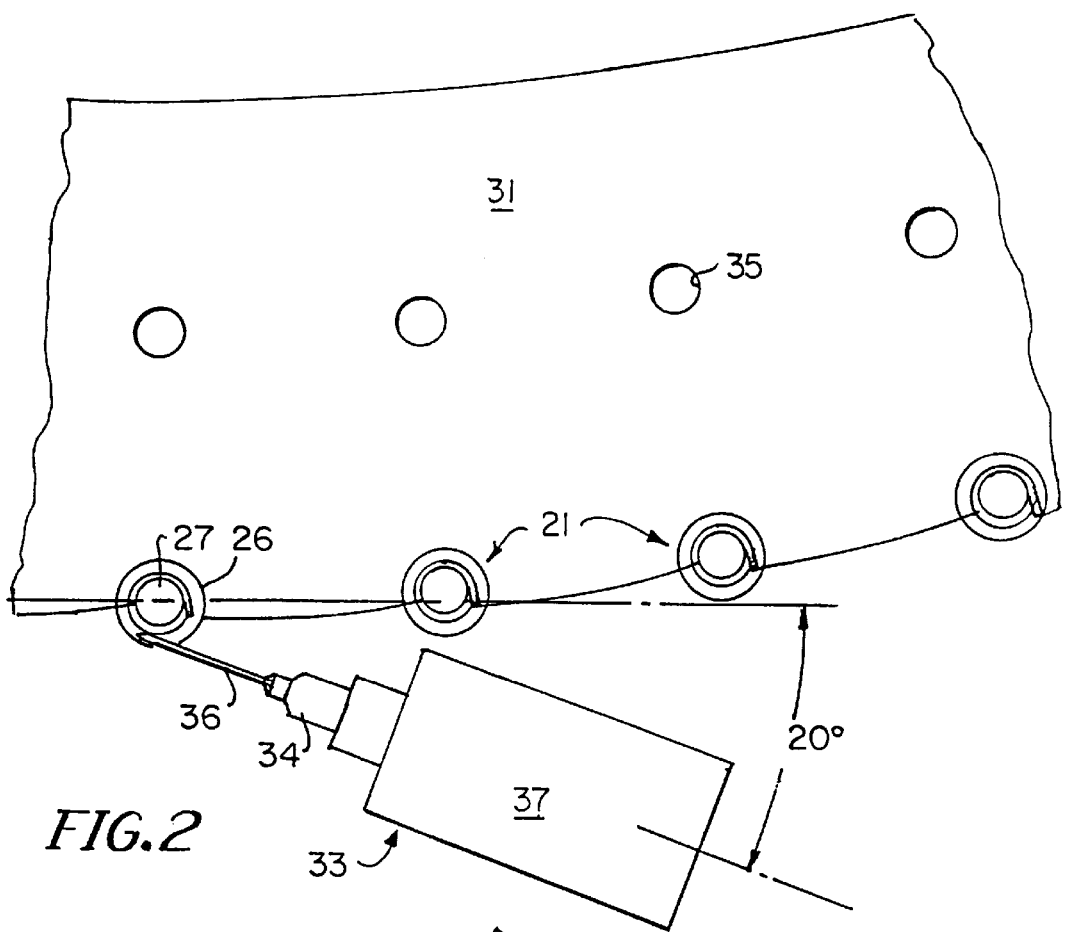
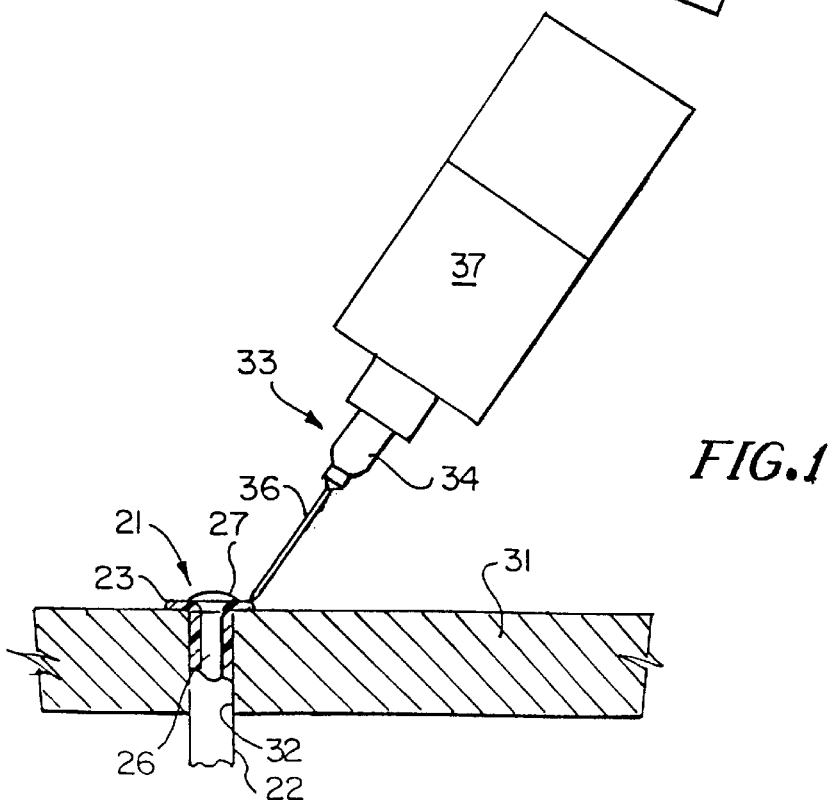
FIG.2
FIG.1

METHOD FOR FORMING ADHESIVE SEAL FOR TIMER FLANGE

This is a division of application Ser. No. 08/704,484 filed Aug. 27, 1996, pending.

BACKGROUND OF THE INVENTION

1. Field of the Invention

This invention relates to a new and improved adhesive seal for timer flange. More particularly, the invention relates to a timer flange seal and to an apparatus and method whereby an adhesive holds the flanges of a timer barrel and timer stem in contact with each other until an elevated temperature, such as a cooking temperature, is reached.

2. Description of Related Art

Cooking timers of the type used in connection with the present invention have been on the market for some years. Such timers are illustrated by U.S. Pat. Nos. 4,748,931 and 5,323,730. The present invention comprises an improvement on such timers whereby the flanges of the stem and barrel are held in close contact with each other from the time of manufacture of the timer until the timer approaches the desired cooking temperature of the poultry or meat in which it is inserted.

SUMMARY OF THE INVENTION

The present invention uses an adhesive between the underside of the flange or cap of a timer stem and an external the flange of the barrel in which the stem is retained to limit "cold flow" or "creep". A retaining material, typically a metal alloy or organic compound, is deposited in the barrel of the timer to retain the stem in retracted position until, after exposure to elevated temperature at or near the desired cooking temperature, the retaining material yields, allowing a spring to extend the stem partially out of the barrel and thereby indicate that the desired cooking temperature has been attained.

The yielding of the retaining material, however, may occur as a result of prolonged compression or extension at or near room temperature. Cold flow or creep is the permanent deformation of the retaining material which occurs as a result of prolonged compression or extension at such room temperature. Plastics and vulcanized rubber exhibit this behavior, as does metal. Such yielding causes premature movement of the stem toward extended position, and is accelerated by elevated ambient temperatures, increased compression or extension, long storage periods and other factors. Such yielding or deformation may reach the point where the retaining material is of insufficient shear strength to maintain the stem in retracted position against the pressure of the spring and thereupon the stem extends fully.

In order to reduce such cold flow or creep, timers are many times held in cold storage and shipped in refrigerated vehicles at substantial cost. Replacement of timers which have encountered creep in this matter and are returned by customers is a substantial expense to manufacturers.

The present invention decreases the effect of the pressure of the spring against the stem, thereby decreasing or eliminating compressing and extension of the stem against the retaining material and thereby materially decreasing or eliminating cold flow or creep. A feature of the invention is that the retaining materials which have heretofore been deemed unsatisfactory because they were more susceptible to cold flow or creep may be used in timers. Spring strength may be increased to minimize the possibility of the plunger sticking due to crusting or caramelizing of meat juices in the timer barrel. Clearances between the stem and the interior of the barrel may be minimized.

In addition, by sealing the flanges of the stem and the barrel together, entry of juices, bastings and seasonings into the barrel is reduced.

The present invention applies a liquid adhesive and, optionally, an accelerator which after curing has a high-bond strength and a temperature range of −65° to 180° F. When the adhesive is subjected to temperatures above that range, it loses bond strength. Hence the adhesive used on the exterior on the barrel does not interfere with the function of the retaining material within the barrel since the external adhesive has melted prior to the timer achieving the predetermined cooking temperature.

BRIEF DESCRIPTION OF THE DRAWINGS

The accompanying drawings, which are incorporated in and form a part of this specification, illustrate embodiments of the invention and, together with the description serve to explain the principles of the invention.

FIG. 1 is a schematic side elevation of apparatus to apply adhesive to timer flanges;

FIG. 2 is a schematic plan of the structure of FIG. 1;

DETAILED DESCRIPTION OF THE PREFERRED EMBODIMENT

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 5:
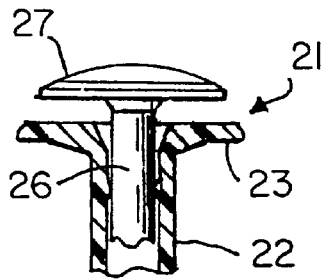
FIG. 5 is a fragmentary section view of a timer.

FIG. 5 shows schematically a conventional timer 21 having a barrel 22 closed at its lower end, open at its upper end and having an external flange 23 at its upper end. Within the barrel 22 is a stem 26 having a top flange or button 27. As well understood in this art, the barrel 22 also contains a spring 71 which biases the stem 26 upwardly and an alloy or organic retaining material 72 which holds the stem retracted until such time as a predetermined cooking temperature is achieved, whereupon the retaining material 72 melts or shears and the spring 71 projects the stem 26. Such projection indicates to the user that the predetermined cooking temperature has been achieved.

FIGS. 1 and 2 illustrate one apparatus and method for applying the adhesive. A rotatable turret 31 is provided with pockets 32 into which the barrels 22 of timers 21 may be inserted. As illustrated in FIG. 1, the stem 26 is depressed so that its button top or flange 27 is in contact with the external flange 23 of barrel 22. Dispenser 33 is positioned at a horizontal angle of approximately 20° relative to a tangent to the particular timer 21 being processed and, the dispenser 33, as shown in FIG. 1, is at a vertical angle relative to the turret 31 of approximately 60°. Dispenser 33 comprises a nozzle 34 having a projecting needle 36 which is positioned on flange 23 adjacent flange 27. Valve 37 dispenses a quantity of adhesive and by capillary action the adhesive enters the narrow space between the two flanges 23 and 27. The adhesive is allowed to cure.

In use, the adhesive holds the flanges 23 and 27 in close proximity against creep as heretofore defined. Cold storage of the timers prior to installation in the poultry or other food product is not required. After the timer 21 has been inserted in a food product, the food product has been sold and the consumer is ready to cook it, the flanges 27 and 23 remain in close proximity. As the product is cooked, the adhesive retaining the flanges 23 and 27 together melts and the retaining material (not shown) within the barrel 22 retains the stem 26 in retracted position. When the predetermined cooking temperature is achieved, the retaining material melts and the spring (not shown) causes the stem 26 to be elevated relative to the barrel 22, indicating to the consumer that the cooking temperature has been reached. Since the adhesive has already been melted, there is no interference with the proper operation of the timer.

A preferred adhesive is a product sold by Loctite as Product 460. Other cyanoacrylates may be used. Adhesives such as epoxies, thermoplastics, anaerobics, ultraviolet cured adhesives and others may be used. Such adhesives use different solvents, primers and activators/accelerators either to prepare surfaces for bonding, increase cure speed, increase gap filling capacity, insure proper curing on inactive surfaces and decrease fixturing time. Solvent bases may be acetone, alcohol, trichloroethane, freon TA, nitromethane, water and many others.

An accelerator is preferably applied to the adhesive within a few seconds of application of the adhesive. A preferred liquid accelerator is sold by Loctite as Product 7452. The accelerator shortens the curing time of the adhesive and lowers the strength of Product 460 to make it more suitable. Use of acetone based accelerators maintains the clear appearance of the adhesive after it cures. Other accelerators such as alcohol or water tend to turn the adhesive white. An accelerator is desirable because the timer may be packaged within a shorter time period and thus promotes high speed manufacture.

Figure 4:
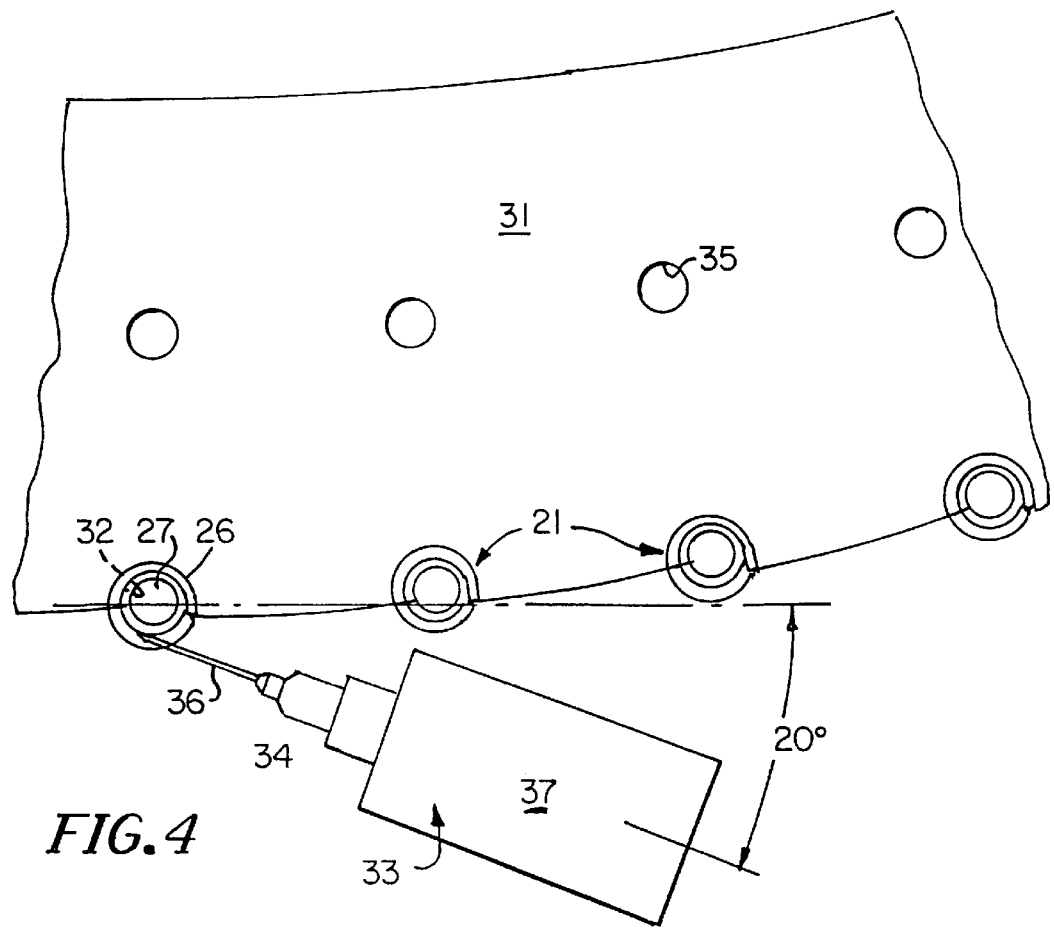
FIGS. 3 and 4 are views similar to FIGS. 1 and 2 of a modification.
Figure 3:
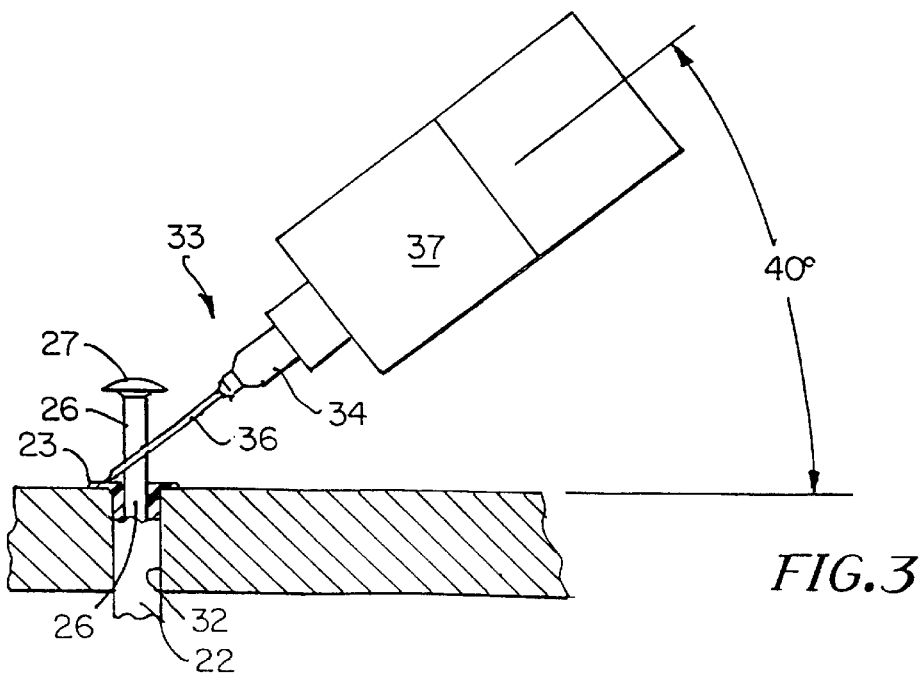

FIGS. 3 and 4 illustrate an alternate method of applying the adhesive and, optionally, as accelerator for the adhesive. In this arrangement, the stem 26 is in projected position. The dispenser 33 (here shown at an angle of 40°) ejects adhesive on the flange 23. The timer 21 is then heated until the retaining material liquifies, whereupon the stem 26 is depressed and is held in depressed position until the retaining material solidifies and the adhesive on the flanges 23 and 27 cures.

Figure 6:
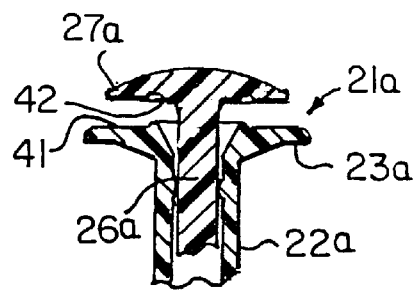
FIG. 6 and 7 are views similar to FIG. 5 of modifications.

FIG. 6 shows an alternate construction of timer 21a. A ridge 41 is molded above the surface of flange 23a which prevents adhesive deposited on the flange from entering the cavity of the barrel 22a. To accommodate the ridge 41 circular groove 42 is formed in the underside of flange 27a mating with the ridge 41.

Figure 7:
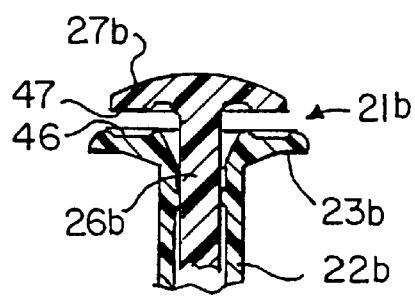

FIG. 7 shows still another modified structure wherein an annular channel 46 is formed in the top of flange 23b and a corresponding mating annular ring 47 is formed on the underside of flange 27b. Channel 46 confines the adhesive so that it neither flows into the opening in the barrel nor flows off the edge of the flange 23b.

In other respects, the structure of the timers shown in FIGS. 6 and 7 resemble that of FIG. 5 in the same reference numerals followed by the subscripts a and b respectively, are used to indicate corresponding parts.

Figure 8:
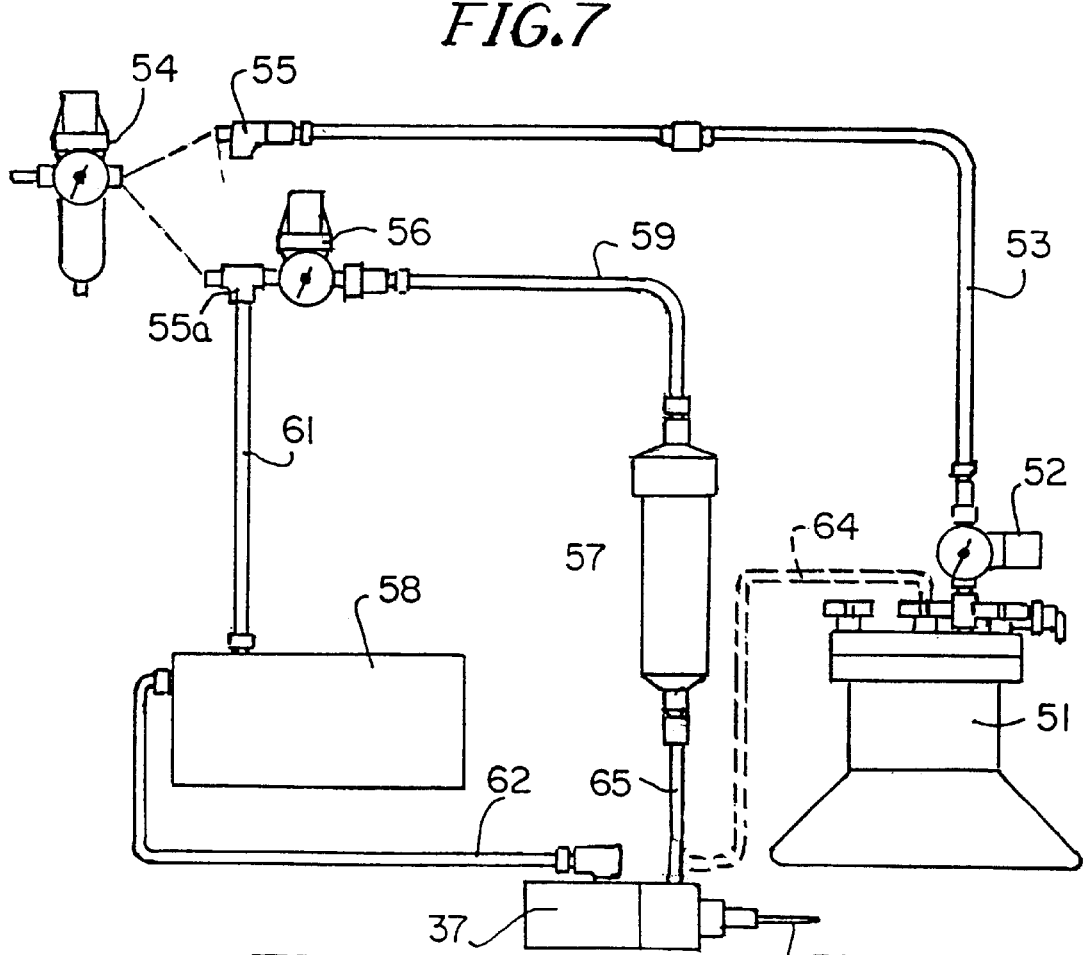
FIG. 8 is a schematic piping diagram showing alternative dispenser controls.

FIG. 8 illustrates alternate means for controlling dispenser 37, depending upon the volume of adhesive required. A source of filtered compressed air flows from regulator 54 either to tee 55 or 55a.

For large flow, air from tee 55 travels through line 53 to regulator 52 and then to adhesive reservoir 51. Air also flows from regulator 54 through 55a through line 61 to control 58 and thence is pulsed via line 62 to valve 37 which starts and stops dispensing adhesive. When valve 37 is open, adhesive from reservoir 51 flows through line 64 to valve 37 and then out needle 36.

For small flow, air from tee 55a flows through regulator 56 and line 59 to adhesive cartridge 57. Under control of valve 37 from control 58, adhesive flows from cartridge 57 through line 65 to valve 37 and thence to needle 36.

Manual adjustment of valve 37 and regulators 52 or 56 adjusts the volume of adhesive conducted through line 64 or 65 and thus dispensed through needle 36.

When a liquid accelerator for the adhesive is used, a system duplicating that of FIG. 8 may be used therefor. The accelerator is applied a few seconds after the adhesive. In the system of FIG. 1, the accelerator is applied just after the adhesive has had time to enter the space between the stem and barrel flange. In the system of FIG. 3 it is applied immediately after the stem is depressed against the barrel. In either instance the accelerator mixes with the adhesive by capillary action.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of preventing cold flow and creep in timers comprising a barrel having an open upper end surrounded by a barrel flange and a stem partially within said barrel having a top flange above said barrel flange, said method comprising depositing an adhesive between said flanges and curing said adhesive with said flanges compressed together, whereby said adhesive secures said flanges together at temperatures elevated above ambient atmospheric temperature.

2. The method of claim 1 in which the step of depositing an adhesive is performed with said flanges compressed together, said adhesive entering between said flanges by capillary action.

3. The method of claim 2 in which the step of depositing an adhesive is performed with said flanges apart and which comprises the additional step of pressing said flanges together while said step of curing said adhesive is performed.

4. The method of claim 2 in which said adhesive is a cyanoacrylate.

5. The method of claim 4 in which said adhesive is alkoxy-ethyl cyanoacrylate.

6. The method of claim 1 which further comprises the step of depositing an adhesive accelerator adjacent said flanges, said accelerator entering between said flanges by capillary action.

7. The method of claim 6 in which said accelerator is acetone based.

8. The method of claim 1 which further comprises depositing an accelerator for said adhesive adjacent said adhesive before said step of curing.

9. The method of claim 8 in which said flanges are compressed before said step of depositing said accelerator.

10. The method of claim 9 in which said adhesive and thence said accelerator are applied to said barrel flange.

* * * * *